Sept. 29, 1931.        A. F. VICTOR            1,825,254
             INTERMITTENT FEED FOR MOTION PICTURE APPARATUS
                     Filed April 24, 1930      4 Sheets-Sheet 4
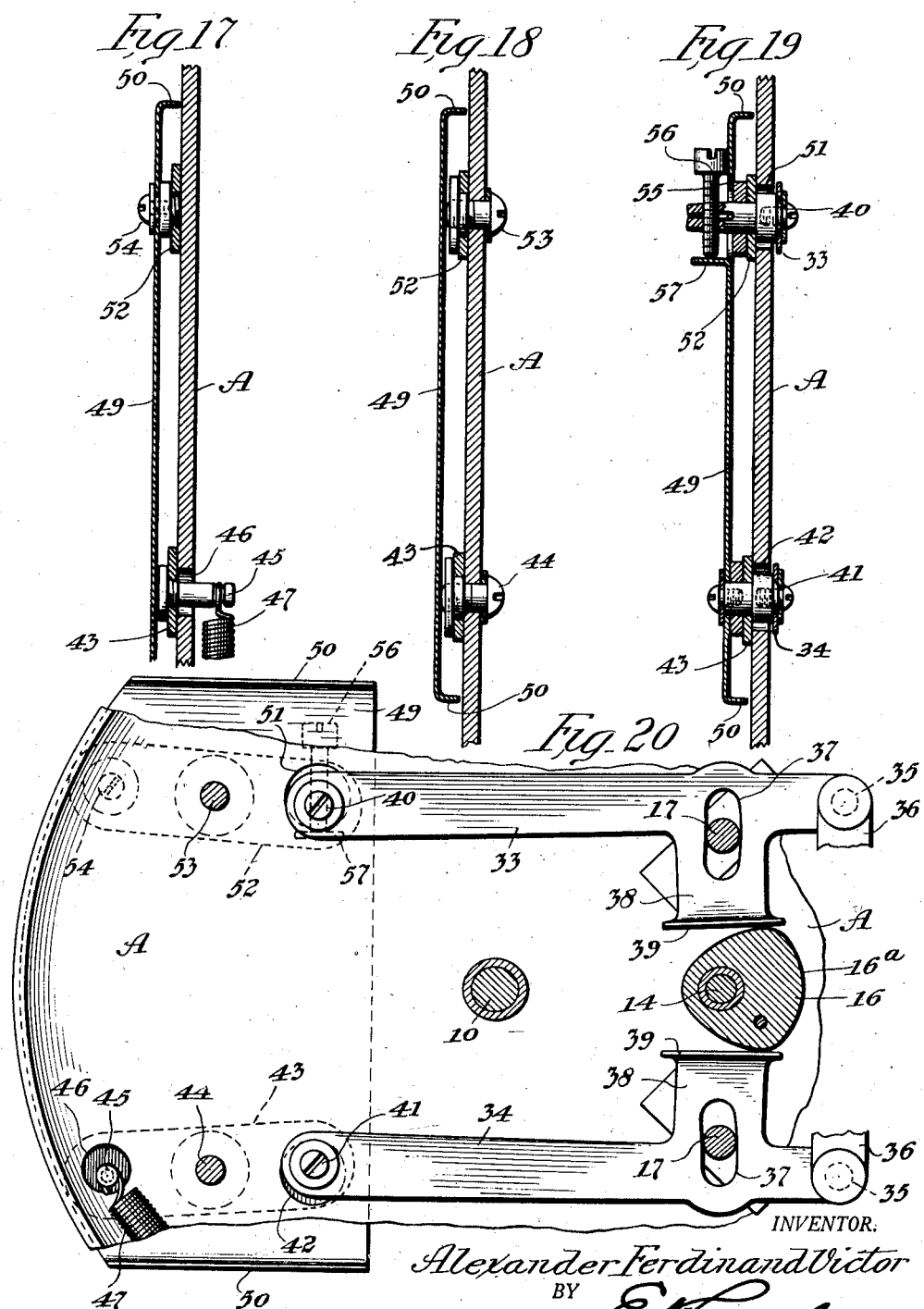

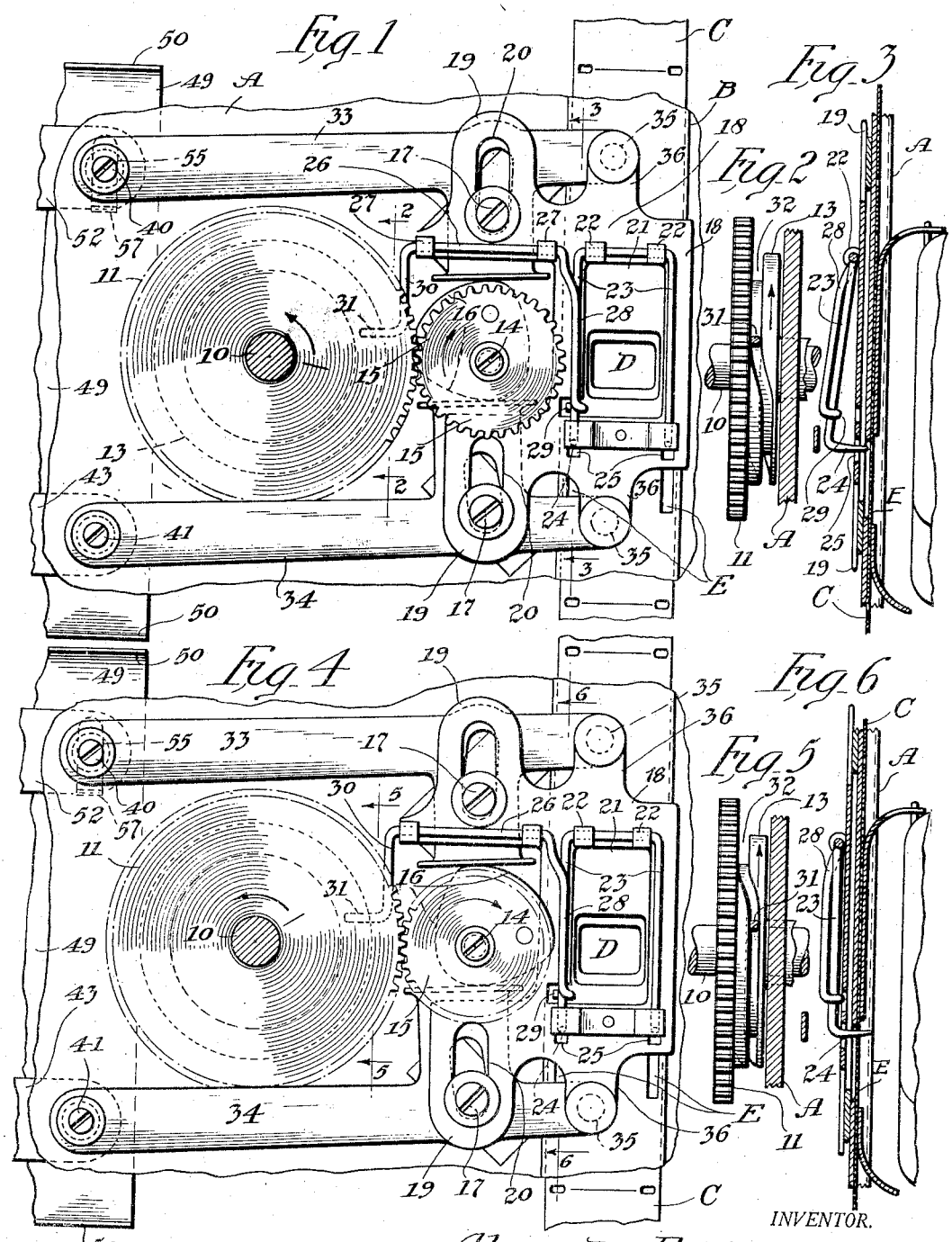

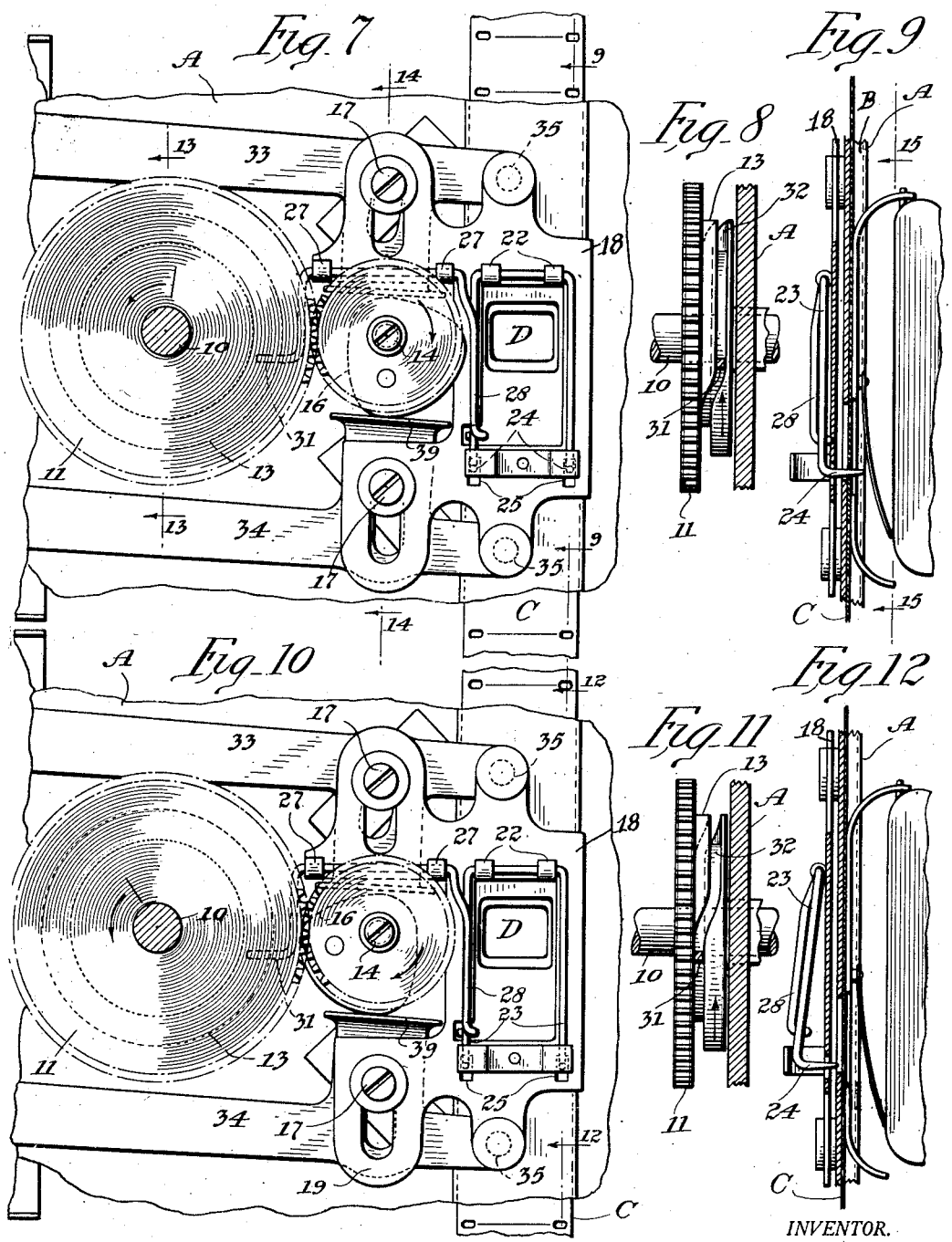

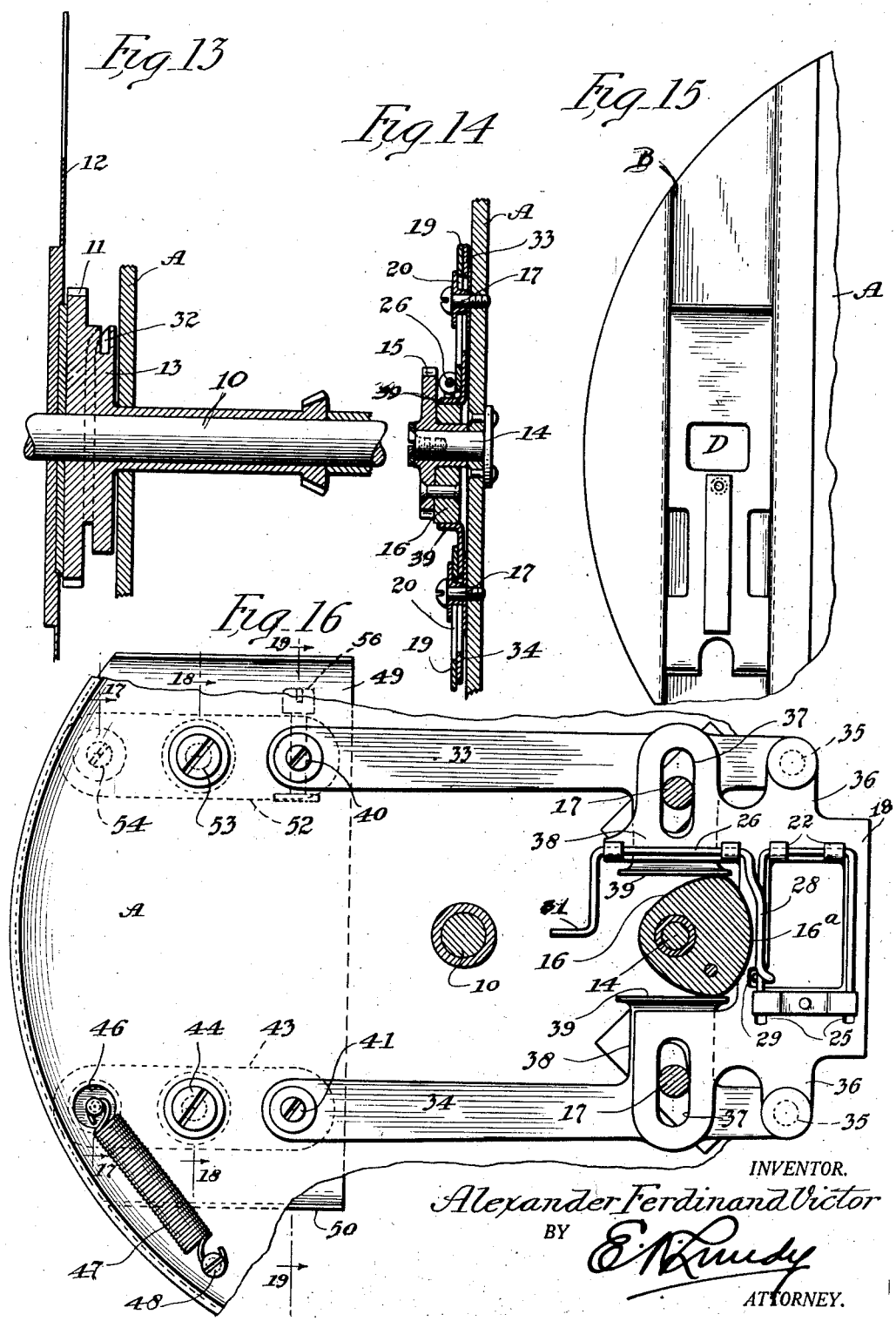

Patented Sept. 29, 1931

1,825,254

UNITED STATES PATENT OFFICE

ALEXANDER FERDINAND VICTOR, OF NEW YORK, N. Y.

INTERMITTENT FEED FOR MOTION PICTURE APPARATUS

Application filed April 24, 1930. Serial No. 446,998.

My present invention relates to film actuating mechanism for apparatus used in the cinematographic art, and it has particular reference to a structure whereby the film is intermittently fed past the aperture for either photographing or projecting pictures successively upon the strip of film.

In intermittent feed devices the reciprocatary motion of the film-engaging members is quite rapid and is frequently in certain structures the movement is accomplished through the medium of a continuously rotatable cam that engages members of a shuttle to slide the latter vertically upon the housing or other portion of the apparatus, and on account of the rapid speed of operation there is sometimes an appreciable amount of wear upon the moving parts thus causing lost motion and creating "chatter" during operation.
In the apparatus which is used professionally or commercially, as distinguished from apparatus used by the novice or amateur, provision is sometimes made so that an operator may open the housing when the apparatus is not in use and repair or alter the relation of the parts so as to take up whatever wear may be found to be present.

In apparatus for use by the novice or amateur the structure is of miniature form, the parts are necessarily small and the housing is in the form of a constricted casing so that it is difficult for an unskilled person to make adjustments such as above mentioned and as a result the apparatus must be placed in a repair-shop for the adjustment of the wear.

With my present device I have devised a shuttle that is reciprocated by a continuously rotatable cam and I mount the shuttle in a hinged manner upon the end portions of lever arms that are pivotally mounted upon the housing or other support. Also I have provided means for adjusting the pivoted ends of the arms towards each other in such manner that any noticeable wear between the cam and the parts engaged thereby may be taken up by means of a simple adjusting structure. The manner of providing the fulcrums of the lever arms is what might be termed a "floating" pivot because the pivotal members are not actually secured to the support or housing but are carried upon suitable rocker-arms which themselves are pivoted on the support or housing. The operation of these rocker arms is similar to the action of a cam or cams engaged with the lever arms.

While the beforementioned operating parts of the structure are preferably enclosed within the housing, I have positioned an adjusting element upon the exterior of the latter which it is readily accessible to the person operating the apparatus. The arrangement of the parts of my invention is such that a novice, while operating a projector for example, and having discovered that there is lost motion due to wea , may readily take up the slack while the projector continues to operate so that it is necessary to stop the display of the motion picture being projected.

My present invention has numerous objects in view, among which are the provision of means whereby the adjusting of the intermittently movable parts is accomplished in a simple manner. Further objects reside in the provision of a structure that is compact in the disposition of the parts; that is simple to operate, is novel in construction, and is dependable in its operation when manipulated by even an unskilled person. Other objects will be apparent after my invention is understood.

I prefer to accomplish the objects of my structure and to carry out my invention in substantially the manner hereinafter fully described and as more particularly pointed out in the claims, reference being herein made to the accompanying drawings that form a part of this specification.

In the drawings:—

Figure 1 is a view in elevation of my improved intermittent feed mechanism, the housing being broken away and the illustration being one in which the structure is viewed from the interior of a motion picture projector and looking in the direction towards which the picture is projected.

Figure 2 is a vertical transverse section, taken on line 2—2 of Figure 1, showing the relative position of the edge cam for moving the film engaging fingers in and out of the film.

Figure 3 is a vertical section taken on line 3—3 of Figure 1, showing the position of the film engaging fingers at the upper ends of their movement, prior to engaging the film as illustrated in Figure 1.

Figures 4, 5, and 6 are views, similar to Figures 1, 2, and 3 respectively, showing the relative positions of the parts after the film engaging fingers have entered the film.

Figures 7, 8, and 9 are views, similar to Figures 1, 2, and 3 respectively, showing the next step of the intermittent feed after the film has been moved downwardly by fingers.

Figures 10, 11, and 12 are views, similar to Figures 1, 2, and 3 respectively, showing the relative positions of the parts at the time the fingers withdraw from the film after the film has been moved down.

Figure 13 is a vertical transverse section, taken on line 13—13 of Figure 7, showing the arrangement and assembly of the main drive shaft and the parts carried thereby.

Figure 14 is a vertical section, taken on line 14—14 of Figure 7, showing parts of the shuttle, the arms that carry the same, and the actuating cam.

Figure 15 is a view in elevation of film path or passageway looking at the same in the plane of line 15—15 on Figure 9.

Figure 16 is a view similar to Figure 1 showing more of the housing structure and the adjusting means slack take up and with the actuating gears omitted.

Figure 17 is a transverse section, taken on line 17—17 of Figure 16, looking in the direction of the arrows.

Figure 18 is a vertical section, taken on line 18—18 of Figure 16, and looking in the direction of the arrows.

Figure 19 is a vertical section, taken on line 19—19 of Figure 16, looking in the direction of the arrows.

Figure 20 is a view similar to Figure 16, a portion of the structure being omitted at the right-hand side and showing the relative positions of the arms after an adjustment has been made to take up wear or slack.

The drawings, it will be understood, are more or less schematic for the purpose of illustrating a typical or preferred form in which my invention may be made, and in said drawings similar reference characters have been employed to designate like parts wherever they appear throughout the several views.

In the drawings one of the walls of the housing or casing, designated as A, provides a support for the mechanism herinafter described, and has a slightly depressed grove B extending vertically in its exterior surface that provides a passageway in which the strip or ribbon of film C is intermittently moved downwardly in a vertical direction by suitable feed mechanism. At a suitable location the usual light aperture D is provided in front of which the film pictures are intermittently stopped for the purpose of projection, and adjacent the aperture are longitudinally extending parallel slots E in which the film engaging fingers or claws enter during the operation of moving the film downwardly. Bearings are provided in the housing wall A for an actuating or drive-shaft 10 that carries upon it a large gear 11, the shutter 12 and edge cam 13. Said shaft is driven by any suitable or desired mechanism to rotate it continuously in a given direction. Intermediate the shaft 10 and the aperture D is a stub-shaft 14 that carries a pinion 15 in mesh with and actuated by gear 11 and also mounted upon shaft 14, and rotatable with the same and the pinion 15, is a cam disk 16.

Above and below the stub-shaft 14 are guide pins or guide-spindles 17 that preferably aline with each other and with the stub-shaft and afford guides for opposite portions of the reciprocating shuttle. The shuttle consists of a flat plate 18 of substantially U-shape, the arms of the U being positioned horizontally and are provided with oppositely disposed lateral extensions 19 that are provided with longitudinal slots 20 axially alining with each other and which are engaged with the guide-pins or guide-spindles 17 so as to permit of a free reciprocatory movement of the shuttle in a vertical plane. The connecting member of the U-shaped shuttle plate has a vertically elongated opening 21 in it so that during the reciprocation of the shuttle the light aperture D will not be obscured.

Alining bearing knuckles 22 are formed adjacent the upper edge of the opening 21 to receive and journal the connecting element of an inverted U-shaped film-engaging member that is swingingly mounted therein. The depending parallel arms 23 of this member extend down alongside the opening 21 in the shuttle and at their lower ends are bent laterally towards the wall A to provide claws or fingers that are adapted to be projected through slots 25 in the shuttle, and through the slots E in the film guide groove, to engage the perforations in the edges of the film strip.

The means for moving the claws 24 into and out of the film perforations consists of a U-shaped piece of wire, the connecting member 26 of which is journaled in bearing knuckles 27 formed upon the lower edge of the upper arm of the U-shaped shuttle plate 18, and the arm 28 of this actuating member which is nearest the claw-arms 23 extends along the side of one of said claw-arms and at its lower end is formed an eye 29 around said claw arm. The opposite arm 30 of this actuating member has a laterally bent extension 31 that projects into and engages the groove 32 of the edge cam 13.

The mechanism for actuating the shuttle to move it up and down in a reciprocating manner consists of the upper and lower lever arms 33 and 34, that are best shown in detail in Figure 20, and which are pivoted upon their ends, farthest from the shuttle, on pins or spindles 40 and 41 respectively. These lever arms are substantially horizontal, and at their ends farthest from the pivots they are connected to the shuttle 18 by pivots 35 mounted in lugs 36 projecting in opposite directions from the upper and lower edges respectively of the shuttle plate. Intermediate their ends the lever arms 33 and 34 are provided with transverse slots 37 through which the guide pins or spindles 17 pass and afford guidance for these lever arms. Adjacent these slots 37 the lever arms are provided with lateral lugs 38 that project towards each other in the manner shown in Figure 20 and at their edges adjacent nearest each other said lugs are provided with lateral flanges or shoulders 39. These flanges or shoulders 39 are so disposed that they are engaged by the edge of the cam disk 16 and during the rotation of the latter the coaction between the cam and the flanges will cause a vibratory motion to be imparted to the lever arms. Attention may be called to the fact that one of the surfaces 16ª of the cam-disk is concentric with its axes of rotation so that while said edge is engaged with a flange or shoulder there is no reciprocation of the lever arms 33 and 34, but when one or the other of said flanges 39 is engaged by an eccentric portion of the cam-disk 16 the lever arms are moved in an upward or downward direction.

On account of the very rapid operation of the parts heretofore described a certain amount of wear necessarily takes place between the surfaces where there may be friction, such for example, as upon the edges of the flanges or shoulder 39 that are engaged by the cam-disk 16. In order to take up this wear, which causes lost motion and "chatter," I have provided means for adjusting one or both of the spindles 40 and 41. To this end the lower spindle 41 passes through an enlarged opening 42 in the housing wall and is mounted upon the adjacent end of a short rocker-arm 43 that is swingingly mounted upon a pivot pin 44 intermediate its ends and carried upon the housing wall A. A stud 45 projects from the farthest arm of the rocker 43 into an enlarged opening 46 in the housing wall, while its inner end is secured to a coiled contraction spring 47 that is anchored at its opposite end upon the housing wall by means of a pin 48. The tendency of the spring is to move the spindle 41 toward the upper edge of the opening 42 and thus yieldably urge the lever arm 34 and its flange 39 into contact with the edge of the cam-disk 16.

The spindle 41 extends through the rocker arm 43 and is connected to a link member 49 that is in the form of a flat plate, the details of which will be found in Figures 17 to 20 inclusive, from which it will be noted one vertical edge is straight and the opposite vertical edge is curved to conform to the shape of the housing wall A while its upper and lower edges are provided with inturned flanges 50 that extend towards the housing wall A. This link element is for the purpose of connecting the adjusting devices for the respective lever arms 33 and 34. When the plate or link 49 is moved downwardly the spindle 41 will move towards the bottom of the opening 42 in the housing and the rocker arm 43 will have its opposite end moved upwardly against the urge of the coiled spring 47.

The upper lever arm 33 has its pivot or spindle 40 projected through an enlarged opening 51 in the housing wall and is secured to the adjacent end of a rocker arm 52 that is pivoted intermediate its ends upon the housing wall A by means of the pin 53. The opposite wall of the rocker arm 52 is provided with a pivot 54 that passes through and is secured to the link plate 49 and thus connects said rocker arm 52 to said link. The spindle 40 is somewhat longer than the spindle 41 for the lower lever arm and it passes through an elongated slot 55 in the link plate 49 (Fig. 19) and its projecting portion is bored transversely and threaded to receive an adjusting screw 56. Below the spindle 40, the link plate 49 is provided with a shoulder 57 that is engaged by the lower end of the adjusting screw 56 that is upon the exterior of both the housing and the link plate 49 where it is readily accessible to the operator for the purpose of adjustment.

By rotating the screw 56 to move the link plate in the proper direction to rock the rocker arms 43 and 52 causing the lever 33 and 34 to move towards each other a very slight distance so that any lost motion or wear between the cam-disk 26 and the flanges 39 of the lever arms will be taken up. It will be seen this may be readily done while the shuttle is in operation and while the film is being moved through the aperture by the feed mechanism.

The ratio of operation between the pinion 15 on the stub shaft and gear 11 on the main shaft is preferably two-to-one, the stub shaft revolving twice during one revolution of the main shaft, and as the edge cam 13 rotates with the main shaft it follows that the claws enter the film perforations during alternate downward movements of the intermittent feed shuttle, thus causing twice as long a period of rest for the film in front of the exposure or light aperture D. The shutter 12 is of Maltese-cross pattern having four cutout portions and four blades of somewhat keystone shape that project from the central hub or disk. This structure permits a plurality of exposures of each individual picture during the comparatively long period of rest of the film so that the amount of "flicker" of the subject viewed on the screen is reduced to a minimum and the successive exposures appear as practically continuous upon the screen.

What I claim is:—

1. An intermittent feed mechanism for motion picture apparatus comprising a support having an aperture past which a film is moved, a reciprocable film engaging structure adjacent said aperture, vibratory arms pivotally connected to said reciprocable structure and pivotally mounted on said support, a rotatable cam engaged with said arms, and means for adjusting said arms towards and away from each other.

2. An intermittent feed mechanism for motion picture apparatus comprising a support having an aperture past which a film is moved, a reciprocable film engaging structure adjacent said aperture, vibratory arms pivotally connected to said reciprocable structure and pivotally mounted on said support, a rotatable cam engaged with said arms intermediate their pivots, and means on said support for adjusting said arms towards and away from each other.

3. An intermittent feed mechanism for motion picture apparatus comprising a support having an aperture past which a film is moved, a reciprocable film engaging structure adjacent said aperture, vibratory arms pivotally connected to said reciprocable structure and pivotally mounted on said support, a rotatable cam engaged with said arms, intermediate their pivots, and means for adjusting the support pivots of said arms towards and away from each other.

4. An intermittent feed mechanism for motion picture apparatus comprising a housing affording a support and having an aperture past which a film is moved, a reciprocable film engaging structure within said housing adjacent said aperture, vibratory arms pivotally connected to said reciprocable structure and pivotally mounted upon the interior of said housing, a rotatable cam engaged with said arms, and means, having a portion extended outside said housing, for adjusting said arms towards and away from each other.

5. An intermittent feed mechanism for motion picture apparatus comprising a support having an aperture past which a film is moved, a reciprocable shuttle structure and means for actuating the same to engage and move the film, pivoted lever-arms connected to said shuttle structure, and means for bodily moving the fulcrum of one of said lever-arms with respect to the other fulcrum.

6. An intermittent feed mechanism for motion picture apparatus comprising a support having an aperture past which a film is moved, a reciprocable shuttle structure and means for actuating the same to engage and move the film, lever-arms connected to said shuttle structure, a rocker-arm upon which one of said lever-arms is fulcrumed, and means for actuating said rocker-arm to move its lever-arm towards and away from the other lever-arm.

7. An intermittent feed mechanism for motion picture apparatus comprising a support having an aperture past which a film is moved, a reciprocable shuttle structure and means for actuating the same to engage and move the film, lever-arms connected to said shuttle structure, a pair of spaced rocker-arms on said support upon which said lever-arms are fulcrumed, and means for actuating said rocker-arms to adjust said lever-arms toward and away from each other.

8. An intermittent feed mechanism for motion picture apparatus comprising a support having an aperture past which a film is moved, a reciprocable shuttle structure and means for actuating the same to engage and move the film, lever-arms connected to said support and coacting with said shuttle structure, and a cam device for moving one of said arms towards and away from the other arm.

9. An intermittent feed mechanism for motion picture apparatus comprising a support, a shuttle structure reciprocable thereon, means for actuating the shuttle to engage the film, lever-arms pivotally connected to said shuttle structure, rocker-arms fulcrumed on said support and having the adjacent ends of said lever-arms pivotally connected thereto, and adjustable means connecting said rocker-arms whereby to cause a relative movement between said lever-arms.

10. An intermittent feed mechanism for motion picture apparatus comprising a support, a shuttle structure reciprocable thereon, means for actuating the shuttle to engage the film, lever-arms pivotally connected to said shuttle structure, rocker-arms fulcrumed on said support and having the adjacent ends of said lever-arms pivotally connected thereto, a link-plate operatively connecting said rocker-arms, and means for moving said link-plate to cause a relative movement between said lever-arms.

11. An intermittent feed mechanism for motion picture apparatus comprising a support, a shuttle structure reciprocable thereon, means for actuating the shuttle to engage the film, lever-arms fulcrumed on said support and having the adjacent ends of said lever-arms pivotally connected thereto, a link-plate operatively connecting said rocker-arms, and means mounted on the pivot between a lever-arm and its rocker-arm.

12. An intermittent feed mechanism for motion picture apparatus comprising a support having a light-aperture, upper and lower guide spindles adjacent said aperture, a shuttle structure having slotted portions engaged with said spindles, and means for imparting a reciprocatory movement to said shuttle, said means consisting of a pair of spaced lever-arms pivotally connected to said shuttle, a rotatable cam engaged with said lever-arms and pivots for the ends of said lever arms farthest from said shuttle.

13. An intermittent feed mechanism for motion picture apparatus comprising a support having a light-aperture, upper and lower guide spindles adjacent said aperture, a shuttle structure having slotted portions engaged with said spindles, and means for imparting a reciprocatory movement to said shuttle, said means consisting of a pair of spaced lever-arms pivotally connected to said shuttle, a rotatable cam engaged with said lever-arms and adjustable pivots for the ends of said lever arms farthest from said shuttle.

14. An intermittent feed mechanism for motion picture apparatus comprising a support having a light-aperture, upper and lower guide spindles adjacent said aperture, a shuttle structure having slotted portions engaged with said spindles, and means for imparting a reciprocatory movement to said shuttle, said means consisting of a pair of spaced lever-arms pivotally connected to said shuttle, and having guiding coaction with the respective spindles, a rotatable cam engaged with said lever arms and pivots for the ends of said lever arms farthest from the shuttle.

Signed at New York, in the county of New York, and State of New York, this 11th day of March, 1930.

ALEXANDER FERDINAND VICTOR.